United States Patent [19]

Miskowicz et al.

[11] 4,399,955
[45] Aug. 23, 1983

[54] DUAL REEL RETRACTOR

[75] Inventors: John S. Miskowicz; David R. Fischbacher, both of La Porte, Ind.

[73] Assignee: Gateway Industries, Inc., Chicago, Ill.

[21] Appl. No.: 122,289

[22] Filed: Feb. 19, 1980

[51] Int. Cl.³ .................. A62B 35/02; B65H 75/48
[52] U.S. Cl. ............................................. 242/107.4 A
[58] Field of Search .................. 242/107.4 R–107.4 E; 280/801–808; 297/474–480

[56] References Cited

U.S. PATENT DOCUMENTS

| | | | |
|---|---|---|---|
| 3,241,883 | 3/1966 | Fontaine | 242/107.4 R X |
| 3,930,622 | 1/1976 | Tanaka et al. | 242/107.4 A |
| 3,944,164 | 3/1976 | Tibbe | 242/107.4 A |
| 4,008,864 | 2/1977 | Torphammar et al. | 242/107.4 R |
| 4,065,070 | 12/1977 | Pilarski et al. | 242/107.4 A |
| 4,135,683 | 1/1979 | Stephenson et al. | 242/107.4 A |
| 4,245,798 | 1/1981 | Steger | 242/107.4 A |

Primary Examiner—John M. Jillions
Attorney, Agent, or Firm—Fitch, Even, Tabin & Flannery

[57] ABSTRACT

A seat belt retraction apparatus has a single retractor frame carrying reels each having a webbing attached at one end. The reels each have a pawl and ratchet means for locking each reel to prevent rotation of the reel in the belt extending direction. Upon application of predetermined force, an inertia type sensing means displaces a common actuating means to simultaneously actuate each pawl into locking engagement with its associated ratchet means to prevent rotation of each reel in a web extending direction. The preferred actuating means comprises a rotary lifter having a flexible portion for storing energy in the event that its associated pawl bounces on a tip of a ratchet tooth of a ratchet wheel. The actuating means and inertia means may be located outwardly of the sidewalls of the retractor frame.

15 Claims, 8 Drawing Figures

DUAL REEL RETRACTOR

DUAL REEL RETRACTOR

The present invention relates to seat belt retraction mechanisms and more particularly to seat belt retraction mechanisms having a pair of reels mounted in a single frame.

U.S. Pat. Nos. 4,065,070 and 4,135,683 discloses a seat belt retraction apparatus having a single frame for carrying a pair of reels biased to rewind a seat belt on each reel. One of the belt ends on a first reel is to extend about the shoulder of the wearer and the other belt end is to extend about the lap of the wearer. In an emergency situation, an inertia type weight pendulum is activated by the force of sudden deceleration of the vehicle to displace a pawl to lock with a pair of ratchet wheels mounted on the ends of each of a pair of reels to prevent rotation of each of the reels in a seat belt extending direction. A single pawl having four dogs or teeth is provided to engage the four ratchet wheels simultaneously to lock both of the reels simultaneously. The constructions shown in U.S. Pat. Nos. 4,065,070 and 4,135,683, are often used in trucks or other vehicles which travel over rough and bumpy roads or other terrain which causes the seat occupant to bounce up and down. It sometimes occurs that a bump is of sufficient magnitude that the seat cushion, which is usually of foam, allows the occupant to sink down in the seat as the inertia mechanism shifts the pawl into locking engagement with the four ratchet wheels. When the occupant begins to rise as the seat cushion expands, all of the slack is taken from his lap belt and this tightened lap belt holds the ratchet teeth against shifting in the belt rewind direction to allow the dogs to escape from the ratchet teeth and to allow the dogs to return to a non-locking position. Because the dogs for the shoulder belt reel are on the same pawl, these dogs are also held in locking position with the shoulder belt ratchet wheel so that there also is no slack available in the shoulder belt. The situation is uncomfortable for the occupant who either must unbuckle the safety belts or suffer discomfiture. A further problem with having a single pawl for locking two sets of ratchet wheels is that one of the four dogs may contact the outer edge of a ratchet tooth on its associated ratchet wheel; and, when this occurs, the dog may bounce off and prevent the pawl from continuing to travel to its locking position so that none of the dogs will lock if some provision is not made to overcome this possibility.

In the dual spool retractor shown in U.S. Pat. No. 4,065,070 the axes of the respective reels are displaced both vertically and horizontally with the pendulum actuator located rearwardly of the lower reel and under the upper reel. This necessitates an undesirable bulky configuration for the dual retractor. As automobiles become smaller in response to the need to decrease weight and thereby achieve greater fuel efficiency, efficient use of interior space becomes increasingly important. Streamlined seat belt retractors provide more usable interior space.

It is a primary purpose of this invention to provide a new and improved seat belt retractor apparatus having dual reels.

Figure 1:
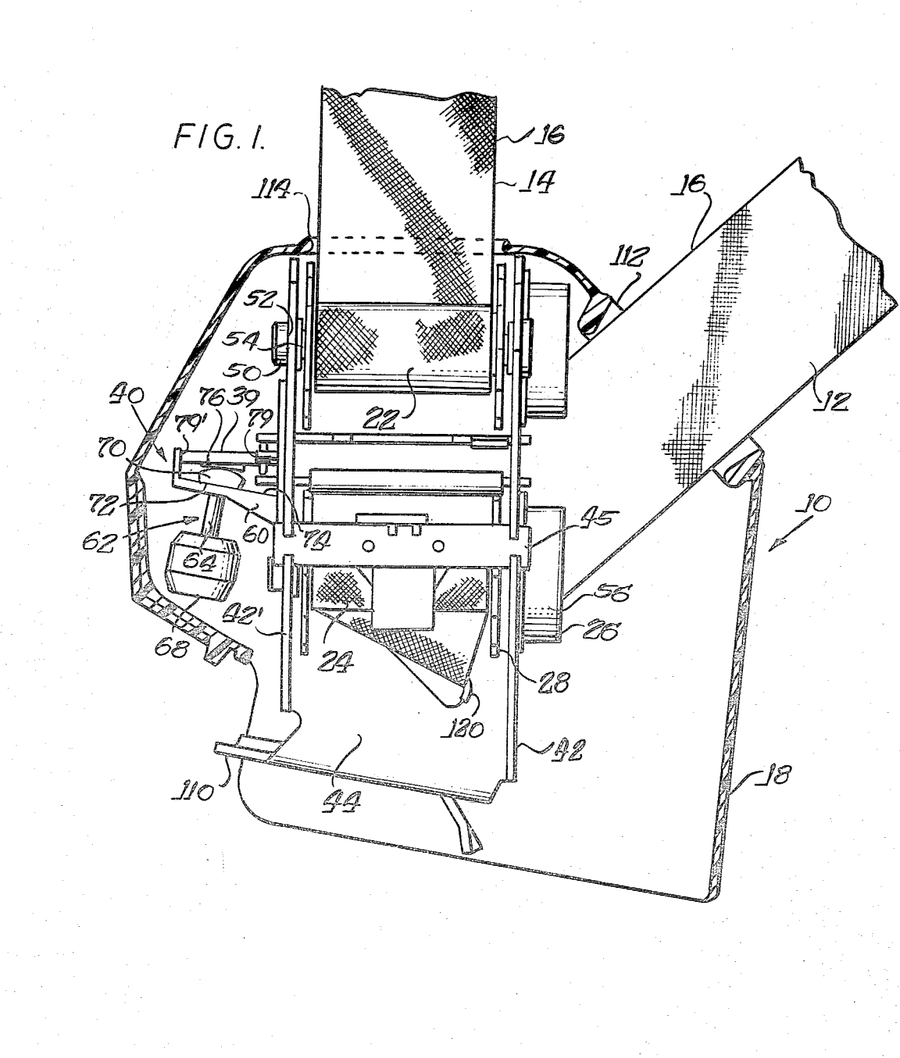
FIG. 1 is a seat belt retractor, the housing of which is cut away to reveal a front elevational view of the retraction mechanism.

Illustrated in FIG. 1 is a seat belt retractor 10 which retracts webbing such as the lap belt or lap portion 12 and shoulder harness or shoulder portion 14 of a seat belt 16. Located within the seat belt housing 18 is a support means or frame 20 from which is supported for rotation an upper reel 22 and a lower reel 24. Webbing is attached at one end to each reel 22 and 24 to be wound therearound. Each reel 22 and 24 is urged in a belt retracting direction by a biasing means 26 mounted on the frame 20 at one end of each reel 22 and 24. The belt 16 may be extended from the reel 22 or 24 by a pull which overcomes the force of the biasing means 26 and rotates the reel 22 or 24 to allow the belt 16 to unwind therefrom. Ratchet wheels 28 are secured to opposite ends of the reel shafts and a pawl means operated by an inertia means serves to lock with ratchet teeth 30 on the ratchet wheels at the time of an accident to prevent belt extension at the time of an accident.

Preferably, the reels 22 and 24 are mounted in a single or common frame 20. While the mounting of a pair of reels in a common frame is disclosed in U.S. Pat. No. 4,065,070, the reels each are off set laterally as well as vertically from each other making the retractor longer than may be desired for certain installations, e.g., passive systems, where such space may not be available. Further, this patent discloses a single rigid and common pawl for locking both reels simultaneously. A problem with such a construction is that the ratchet of the lap belt may hold the lap belt dogs against escape from the ratchet wheel and, because of the single rigid pawl, the dogs on the other end of the single pawl are also maintained in locking position with the ratchet wheels for the shoulder belt reel. It is usually necessary to unbuckle the system to get slack into it to allow the lap belt reel to unwind slightly and to thereby release the single pawl to return from its captured locking position to its unlocking position or else suffer the discomfiture. A further problem with such a construction is that both of the reels will remain unlocked if a pawl tooth on the common pawl bar should hit a ratchet tooth tip on any one of the four ratchet wheels and be held against inward movement to the locking position. From a manufacturing tolerance standpoint with four ratchet wheels with multiple teeth and four pawl teeth on the pawl, the odds are increased that the teeth on one of the four ratchet wheels may be so located in a dynamic situation as to "bounce" its associated dog on the common pawl and thereby prevent any of the pawl dogs from moving into full locking engagement with their respective ratchet wheels.

In accordance with the present invention, the pair of reels 22 and 24 are located adjacent each other and utilize a common inertia actuating means 40 but each has associated with it a separate pawl and ratchet locking means 33 and 35 which may be actuated by a common actuating means but which may be independently returned to their non-locking positions. For instance, if the locking pawl 36 is captured by a ratchet tooth 30 (as shown in dotted lines in FIG. 6) of the lap belt ratchet wheels 28, the pawl 34 for the shoulder belt reel may be in the non-locking position shown in solid lines in FIG. 6. This is achieved because the pawls 34 and 36 are separate and the return of the common inertia actuating means 40 allows the pawl 34 to shift to its non-locking position independently of the captured pawl 30 for the lap belt reel. By shifting his shoulders, the occupant should be able to transfer slack into the lap belt to allow its reel to turn slightly in the rewind direction and thereby allow the pawl dog to escape from the overhang of the holding pawl teeth 30. Also, with the present invention, if one of the pawl dogs 38 on pawl 34 hits a tip 31 of a tooth of its associated ratchet wheel and is momentarily blocked from swinging into locking engagement, the other pawl 36 is still free to move into locking engagement. This is achieved by having a flexible portion 37 (FIG. 8) on the common pawl actuator means being flexed when the pawl 34 is blocked by a ratchet tooth to store energy therein and then to force the previously bounced pawl 34 into locking engagement as the associated reel turns slightly.

Figure 8:
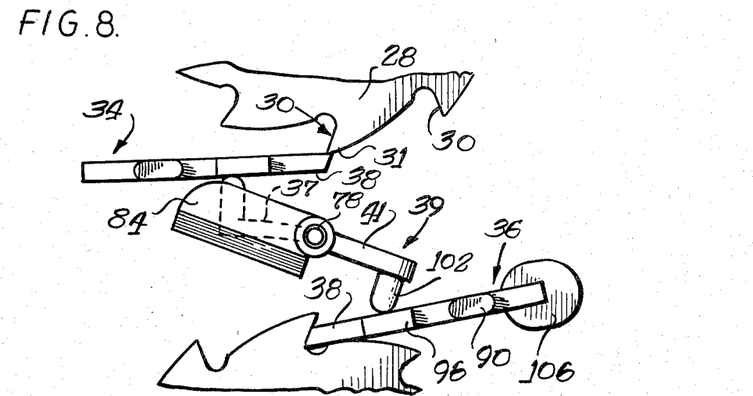
FIG. 8 is a partial elevational view similar to that shown in FIG. 7 in which one of the pawls is locked with an associated ratchet wheel and the other pawl has bounced off the ratchet teeth of an associated ratchet wheel.

Also, in accordance with the invention, a reduced height for the configuration is achieved by having the inertia actuating means 40 located outwardly of a side wall 42' of the common frame 20 and having the pawl actuating means include a small common rotary lifter 39 which lifts one pawl means and pushes downwardly the other pawl means, as best seen in FIG. 8. As best seen in FIG. 1, the rotary lifter is also disposed outwardly of the side wall 42' of the support frame 20. A single inertia pendulum weight 62 may be used to actuate the rotary lifter which, in turn, operates simultaneously pawls 34 and 36.

Thus, it will be seen that for each of the upper and lower reels 22 and 24, there is an associated upper and lower pawl 34 or 36 which moves from a normal or unlocking position to a locking position in which a dog 38, integral with each pawl, catches the teeth 30 of its associated ratchet wheel 28 and stops rotation of the reel 22 or 24 in the belt extending direction. The pawls 34 and 36 which lock with the ratchet wheel 28 on each reel, tilt independently, but are simultaneously actuated by the rotary lifter 39 which is in turn activated by the inertia type sensing means 40 located along the ends of the reel axes to respond to rapid deceleration of the vehicle causing the seat belt to lock during an emergency situation.

While ideally both pawls 34 and 36 should engage their associated ratchet wheels 28, either pawl may bounce free from the end of a ratchet tooth 30. The independently tiltable pawls 34 and 36 allow one pawl to engage its respective wheels 28 irrespective of whether the other pawl engages its respective ratchet wheels 28. At least one side of a pawl actuating arm 41 of the rotary lifter 39 is resiliently flexible so that should a pawl 34 or 36 bounce off of a ratchet tooth 30, energy is stored in the flexed arm which springs back to force the pawl into locking position.

So that the invention may be more fully understood, the invention is now described in greater detail.

The common support frame 20 in which the reels 22 and 24 are mounted, has two parallel sides 42 and 42' each extending perpendicularly from a central web 44. A front tiebar 45 extends between edges of the sides 42 and 42' serves to provide rigidity to the structure.

The reels 22 and 24 are mounted for rotation in bushings 50 disposed through orifices 52 in the respective sides 42 and 42' of the frame 20 in which the axles 54 of the reels 22 and 24 turn.

Also, fastened to the sides 42 of the support frame 20 are the biasing means 26 which are typically spring motors of a type well known in the art in which a helical spring is attached at one end to the frame 20 and at the other end to the reel axles 54. The spring motor is preferably encased in a spring housing 56 which is typically made of plastic. While the biasing means 26 provides sufficient resiliency to fully retract the belt 16, the biasing force of the spring is easily overcome and a slight pull on the belt 16 will extend the seat belt 16 from the reels 22 or 24 rotating the reels in the belt extending direction.

Fastened to opposite ends of each reel 22 and 24 are ratchet wheels 28 which guide the seat belt 16 therebetween. Ratchet teeth 30 on the wheels 28 are faced in a single direction so that while the ratchet teeth 30 may engage with pawls 34 or 36 to prevent rotation of the reels 22 and 24 in a belt extending direction, the reels, at all times, may rotate in a belt retracting direction. While a retracting mechanism may be built having a ratchet wheel 28 only at one end of each reel 22 or 24, ratchet wheels 28 at each end of each reel evenly distribute stress on each reel to prevent possible warping thereof.

Figure 2:
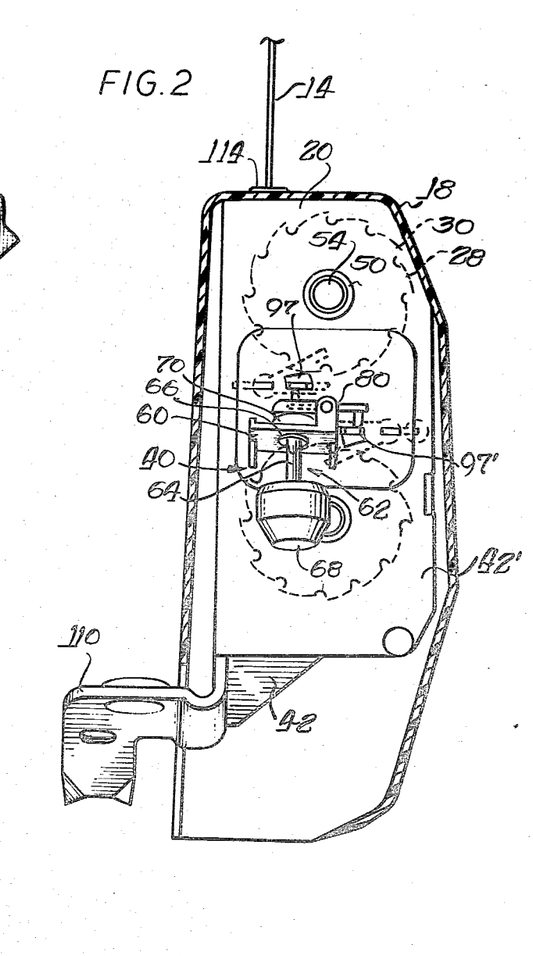
FIG. 2 is the seat belt retractor shown in FIG. 1, the housing of which is cut away to reveal a side elevational view of the retraction mechanism.

In the illustrated embodiment, as viewed in FIG. 2, the reels 22 and 24 each rotate counterclockwise in the belt retracting direction and clockwise in the belt extending direction. It is to be understood, however, that this direction may be reversed to suit the particular application needs and, in fact, modifications may be made to provide a retraction apparatus in which the belt retracting direction of each reel may be opposite that of the other.

In the illustrated embodiment, the reel 22 carrying to the shoulder portion 14 of the belt 16 is located directly and vertically above the lower reel 24 carrying the lap portion 12 of the belt 16. The axles 54 are parallel to each other and are spaced closely adjacent each other, as seen in FIG. 2.

To support the inertia type sensing means 40, a bracket or shelf 60 extends from one side 42' of the support frame 20. The sensing means 40 preferably employs a weight pendulum 62 of the type commonly used with seat belt retraction mechanisms. A shaft 64 of the weight pendulum 62 extends through an orifice 66 (FIG. 2) in the shelf 60 and supports therefrom a weight 68 selected to respond to a predetermined amount of deceleration force. At the top of the shaft 64 is located a button 70, the diameter of which is larger than the orifice. The bottom surface 72 of the button 70 is preferably flat to lie against the upper surface 74 of the shelf 60. The flat bottom surface 72 of the button 70 prevents the pendulum 62 from swinging back and forth except under extraordinary conditions of rapid deceleration. The upper surface 76 of the button 70 is preferably generally arcuate to facilitate movement of the pendulum 62 relative to the rotary lifter 39 as hereinafter described.

Figures 3, 4, 5:
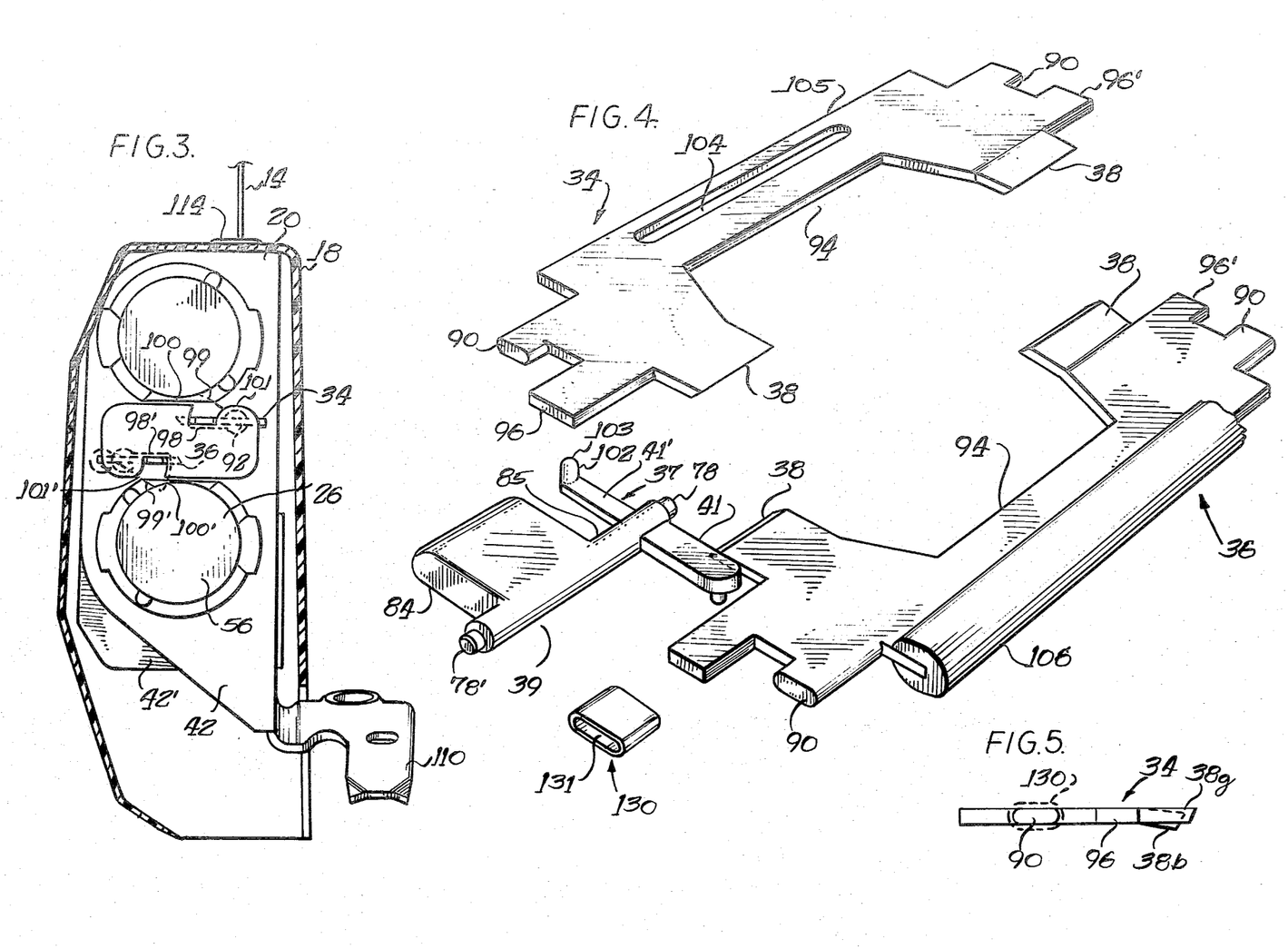
FIG. 3 is the seat belt retractor shown in FIG. 1, the housing of which is cut away to reveal an elevational view of the side of the mechanism of the side opposite that illustrated in FIG. 2.
FIG. 4 is an exploded perspective view of the two pawls and the rotary lifter.
FIG. 5 is an end view of the upper pawl as illustrated in FIG. 4.
Figure 6:
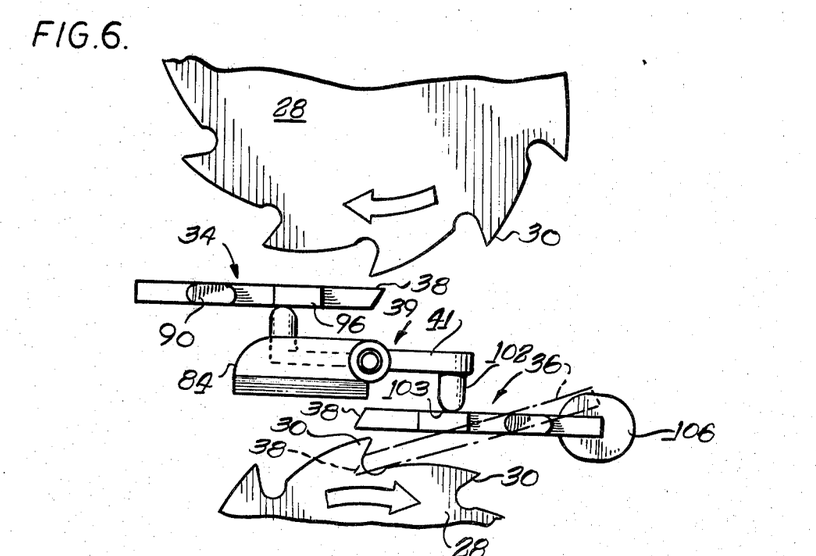
FIG. 6 is a partial side elevational view of the pawl-rotary lifter assembly in its unlocking position relative to ratchet wheels.
Figure 7:
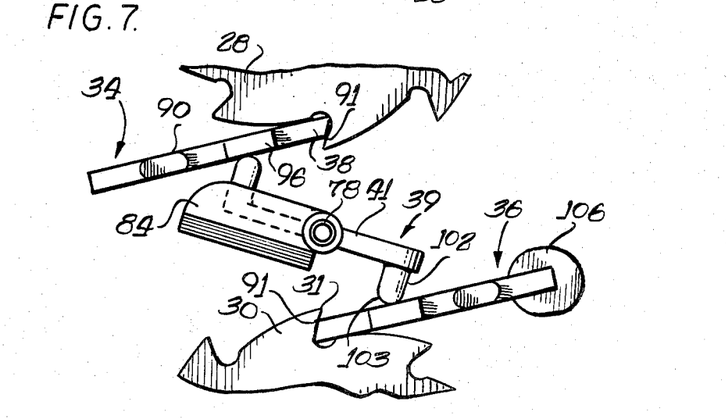
FIG. 7 is a partial side elevational view similar to that of FIG. 6 in which the pawl-rotary lifter assembly is in locking position in respect to the ratchet wheels.

The rotary lifter 39 pivots from a normal position (FIG. 6) to an actuating position (as best seen in FIG. 7) in which the pawl dogs 38 are pushed toward their respective ratchet wheels. To pivotally mount the rotary lifter, it is formed with reduced diameter ends which are journaled for turning in orifice 79 in the frame 20 and orifice 79' in a flange 80 which extends vertically upward from the shelf 60. The arm 41 of the rotary lifter 39 is located proximal to the frame 20 as is the flexible portion 37 which is in this instance in the form of an arm 41' of smaller size and of greater flexibility than the arm 41. A plate-like member 84 of the rotary lifter 39 located distal to the frame 20 extends from one side of the pivot axis and rests on the top surface 76 of the button 70 to maintain the rotary lifter 39 in its rest position during normal conditions of the vehicle. That is, as best seen in FIG. 4, the member 84 is located outwardly of the axis of a central shaft 85 having the pivot axis therein to assure that the rotary lifter returns whenever the pendulum returns.

When the weight pendulum 62 is upset by sufficient deceleration force, the upper surface 76 of the button 70 cams against the lower surface 86 of the member 84 and lifts the member 84 and pivots the rotary lifter 39 in a clockwise direction, as viewed in FIGS. 6-8, forcing the upper pawl 36 upwardly and forcing the lower pawl 36 downwardly.

The pawls 34 and 36 are designed so as to tilt from an unlocking position to a locking position whereat the dog 38 on each pawl engage with the teeth 30 of the respective reel 22 or 24 when the pawl 34 or 36 is tilted. In the illustrated embodiment, as best seen in FIG. 4, the pawls 34 and 36 are generally flat members mounted for between the sides 42 and 42' of the frame 20. The upper pawl 34 is located below the upper reel 22 and the lower pawl 36 is located above the lower reel 24 providing a compact arrangement of the apparatus 10. The pawls 34 and 36 tilt between a unlocking position and a locking position about an axis through pivot ears 90 and between a horizontal position and a tilted position in a butterfly slot 92. In the unlocking position, the pawls 34 and 36 are in the horizontal position with portions or tabs 96 abutting one side of butterfly shaped slots 92. Also, each pawl has outwardly extending tabs 96 and 96' projecting through slots 97 and 97' in each of the frame sidewalls 22 and 22' with the tabs abutting horizontal sides 98 and 98' (FIG. 3) when the pawls are in their unlocking position.

A large recess 94 on the inner side 95 of each pawl 34 and 36 proximal to the reels 22 and 24 allows free passage of the belt 16. The dogs 38 at each end of each pawl are spaced apart the width of the recess 94 to allow the belt 16 to pass therebetween. The dogs 38 are sufficiently wide to engage with the associated ratchet teeth 30. The edges of the dogs 38 are chamfered between the upper and lower surface at an angle to provide a sharp point to slide past a tip 31 of a tooth and to provide good face to face contact with the front edges 91 of the ratchet teeth 30. The tabs 96 extend outwardly from each end of each pawl 34 and 36 sufficiently to positions for engagement with the rotary lifter 39 so that the rotary lifter may tilt the pawls 34 and 36 from their unlocking position to their locking position.

More specifically, the tabs 96 extend through the slots 97 and 97' in the support frame sidewall 42'. The guide slots 97 and 97' have horizontal straight edges 98 and 98' and angled straight edges 99 and 99' generally colinear with the edges of the butterfly slot 92. The inner 100 and 100' and outer 101 and 101' edges of the guide slot 97 and 97' are arcuate so that the tabs 96 are guided along the arcuate edges between the horizontal straight edges 98 and 98' and the angled straight edges 97 and 97'.

To provide a reduced friction engagement between the tabs 96 and the rotary lifter, the latter is made of plastic and has rounded camming ends 103 abutting the metallic tabs 96. The rounded camming ends 103 are on the distal ends of vertical extending bosses 102 provided at both ends of the rotary lifter arms 41 and 41' to contact the pawls 34 and 36.

To reduce the tooling and inventory costs, the same pawl blank is used to provide each of the upper and lower pawls 34 and 36. As best seen in FIG. 4, the upper left pawl is merely an upside down version of the lower right hand pawl to which a weight bar 106 has been added. Stated differently the upper left hand pawl would appear similar to the lower right hand pawl if the upper pawl were rotated 180° about its upper longitudinal edge. The pawls 34 and 36 are weighted to return to and to remain in their release or unlocking positions. To this end, the center of gravity of the upper pawl 34 is located inward of the pivot ears 90 so that the upper pawl 34 in its unlocking position lies along the lower horizontal edges 98 of the upper guide slots 97. An elongated slot 104 is provided in each pawl 34 and 36 toward the outer edge 105. The weight 106 as seen in the bottom of FIG. 4 is inserted through the slot 104 to shift the center of gravity of the lower pawl 36 to the outer side 105 thereof to maintain the lower pawl 36 in its unlocking position along the upper horizontal edge 98' of the lower guide slot 97'. Means other than weight means such as a spring or other biasing device may alternatively be employed to retain the pawls 34 and 36 in their unlocking position when not actuated.

The release or unlocking position of the rotary lifter 39 and the pawls 34 and 36 are best illustrated in FIG. 6. During normal conditions, the shoulder portion 14 or lap portion 12 of the belt 16 may be pulled to extend the belt 16 by rotating the reels 22 and 24 in a clockwise belt extending direction. The rotary lifter 39 and pawls 34 and 37 located generally perpendicular to the axes of the reels 22 and 24 make no contact with the ratchet wheels 28. When, however, the pendulum 62 is dislocated, as for example may happen if a vehicle impacts on object, the pendulum 62 swings and the button 70 lifts up from the shelf 60 and urges upward member 86 of the rotary lifter 39. The rotary lifter 39 pivots and the bosses 102 on the arms 41 and 41' thereof, push the pawls 34 and 36 toward their locking position. In the locking position as seen in FIG. 7 the dogs 38 engage with the ratchet teeth 30. Rotation of the reels 22 and 24 is thereby halted, and the seat belt 16 may not be further extended and will act to restrain the user from forward movement.

The reels 22 and 24 rotate independently and at different speeds. Accordingly the initial contact between each ratchet wheel and its associated pawl may occur at any angular position of the wheel and at a wide range of speeds. While the engagement of each dog 38 with the ratchet teeth 30 is the desired end result it will be appreciated that in an emergency situation, depending upon the angular position and speed of the wheel 28 relative to the dog 38, that initial contact therebetween may be between a tip 31 of a ratchet tooth and the tip of its associated dog 38 with the pawl 34 or 36 bouncing off the tip 31 of the tooth 30 as shown happening to the upper pawl 34 in FIG. 8. Herein, the arm 41' of the rotary lifter 39 is flexible so that as seen in FIG. 8, the upper pawl 34 bounces off the ratchet wheels 28, the arm 41' may flex downward while allowing the other arm 41 to continue to relocate the corresponding pawl 36 into locking engagement with the wheels 78 of the corresponding reel 24.

The flexing of the arm 41 which results when a pawl 34 bounces off its associated ratchet wheels 28 stores energy in the arm. When the upper reel turns slightly from the position of FIG. 8, the bent arm 41' may spring back to its unflexed state and it will snap the pawl 34 back toward the associated ratchet wheels 28 forcing the pawl into locking engagement therewith. As the springing and restoration of the arm 41 occurs extremely rapidly, the bounced pawl 34 will engage the respective wheels 28 after a slight turning of the reel 22 or 24. In prior art devices wherein a single rigid pawl was provided to lockingly engage with ratchet wheels of a lap and shoulder reel, the pawl could bounce off either reel and relocate at its unlocking position. This would result in continued rotation of both reels rendering the restraint ineffective.

While the shoulder portion of a seat belt significantly increases the restraint thereby provided, many users find the shoulder portion particularly inconvenient or uncomfortable. Accordingly a sizable number of vehicle owners have been known to cut the shoulder portion of the seat belt. Despite the loss of restraint resulting from the unadvised cutting of the shoulder portion, a user of the vehicle may still choose to avail himself of the restraint provided by the lap portion of the belt.

In dual reel retractors such as that described in U.S. Pat. No. 4,065,070, wherein a common locking means locks both reels, cutting of the shoulder portion could under certain circumstances render the lap portion inoperable as well. When the shoulder portion of a belt is cut, the shoulder reel is biased by its respective biasing means to a fully retracted position. The location of the teeth of the shoulder reel relative to the common locking means or pawl is a matter of chance. In an emergency situation a reel attached to a cut belt portion will remain static as no force is exerted thereto in opposition to the biasing means. If the pawl contacts the outer end of a ratchet tooth associated with the inoperative upper reel, the pawl cannot be moved into engagement with the ratchet means associated with the lap reel. In the present invention wherein at least one arm 41' of the rotary lifter 37 is flexible, the pawl 36 associated with the lower reel 24 may be forced into locking engagement with associated ratchet wheel 28 even if movement of the upper pawl 34 is blocked by a static ratchet tooth 30. When the rotary lifter 37 abuts the blocked upper pawl 34 the flexible arm 41' yields so that rotation of the rotary lifter continues and the arm 41 associated with the lower reel 24 forces the lower pawl 36 into locking engagement therewith.

The apparatus 10 is encased in a housing 18 which may be a suitable plastic to protect the mechanism from interference by foreign objects and from exposing the occupants of the vehicle to sharp points of the apparatus 10, such as the ratchet teeth 30. The housing 18, best seen in FIG. 2, has a relatively flat profile which is permitted by the positioning of the weight pendulum 62 outward of the ends of the reels 22 and 24.

The housing 18 has a lap slot 112 and a shoulder slot 114 to permit the lap portion 12 and shoulder portion 14 of the seat belt 16 to pass therethrough. As best seen in FIG. 1, the lap portion 12 is extended through slot 112 which is not parallel to the reel axes necessitating angling of the lap portion 12 of the belt 16 away from the lower reel 24. Accordingly, a webbing protector 120 of plastic covers the upper edge and sides of the slot and guides the lap portion 14 from the direction which it extends from the lower reel 24 to the angle at which it passes through the lap slot 112.

The dual spool retractor of the present invention is also adapted for use in passive restraint systems because the panels 34 and 36 may operate independently and be used with belts going to different occupants or in different directions from a central position between a pair of bucket seats. In such a use, it is probably preferable to provide a flexible and resilient actuating position, such as by making the arm 41 also smaller and flexible like the arm 41', so that both reels may lock independently if the ratchet teeth tips of either reel should hit a pawl dog.

To make sure that the locking pawls 34 and 36 move fully to their locking position with a predetermined angular displacement of the inertia weight, the reactors are usually tested and an adjustment is made, usually termed a "gap adjustment", to assure that the pawl shifts to the locking position. Often, the frame supporting the pendulum is twisted until the proper gap adjustment is achieved in conventional retractors. The gap adjustment may be readily achieved with the present invention in several different manners. For instance, small plastic sleeves 130 (FIGS. 4 and 5) may be slid into the tabs 96 and 96' to effectiuvely increase the thickness of the tabs 96 and 96' and take up any gap or clearance. These sleeves 130 may be made of plastic and have hollow interiors 131 which are sized to have an interference fit with the tabs 96 or 96' to prevent separation of the sleeves from the tabs. The wall thickness of the various sleeves may be varied, e.g., by 0.010 inch. Thus, sleeves 130 with thicker walls may be used where the gaps are large and thin wall sleeves may be used where the gap to be adjusted is small. Alternatively, to having sleeves 130, the height of the bosses 102 may be changed to provide gap adjustment. That is, the rotary lifters may be molded with bosses 102 having different heights and a rotary lifter with larger bosses 102 may be substituted for a rotary lifter having shorter length bosses to adjust the actuating mechanism. On the other hand, the bosses may be made separately from the arms 41 or 41' and different lengths of bosses may be used to adjust the tolerances. Also, the bosses could be threaded into the arms and turned to give an adjusted height for the bosses 102. Thus, it will be seen that adjustments may be readily made with the illustrated actuating mechanism.

While the whole invention has been described according to a preferred embodiment, modifications obvious to one skilled in the art may be made without departing from the teachings of the present invention.

What is claimed is:

1. A seat belt retraction apparatus comprising:
a support means;
a pair of reels, the axes of which are coplanar mounted for rotation in said support means;
webbing attached at one end to each of said reels;
biasing means urging each of said reels in a retraction direction to wind said webbing therearound, said webbing extendable from said reels by a pull on said webbing to overcome the force of said biasing means;
ratchet means on each of said reels;
Pawl means including a first pawl rotatable about a first axis to engage said ratchet means of a first one of said reels and a second pawl rotatable about a second axis offset from said first axis to engage a second ratchet means, each of said pawls being displaceable between an unlocking position and a locking position in which each of said pawl means has locking engagement with its associated ratchet means to prevent its rotation in a web extending direction;
a common actuating means displaceable from a rest position to a pawl actuating position to simultaneously actuate each of said pawl means toward said locking position and to move one of said pawl means into locking position irrespective of the other pawl means being blocked momentarily from its locking position; and
an inertia type sensing means to move said common actuating means to said actuating position when said sensing means detects a predetermined force for preventing rotation of each of said reels in a web extending direction.

2. A seat belt retraction apparatus comprising:
a retractor frame;
a pair of reels mounted for rotation in said frame;
webbing attached at one end to each of said reels;
biasing means urging each of said reels in a retraction direction to wind said webbing therearound, said webbing extendable from said reels by a pull on said webbing to overcome the force of said biasing means;
ratchet wheels having ratchet teeth on each of said reels;
a pair of pawls each separately mounted on said frame for rotation about axes offset from each other and each associated with one of said reels and each displaceable between an unlocking position and a locking position in which each of said pawls has locking engagement with its associated ratchet teeth to prevent rotation of each of said reels in a web extending direction;
a common actuating means displaceable from a rest position to a pawl actuating position to simultaneously actuate each of said pawls toward said locking position and to shift one of said pawls to said locking position even though the other pawl may be momentarily blocked;
an inertia type sensing means to move said common actuating means to said actuating position when said sensing means detects a predetermined force for preventing rotation of each of said reels in a web extending direction, said actuating means being moveable to said rest position from said pawl actuating position and allowing either of said pawls to return to its unlocking position even though the other of said pawls is captured by its associated ratchet at the locking position.

3. A seat belt retraction apparatus comprising:
a support means;
a pair of reels, the axis of which are coplanar mounted for rotation in said support means;
webbing attached at one end to each of said reels;
biasing means urging each of said reels in a retraction direction to wind said webbing therearound, said webbing extendable from said reels by a pull on said webbing to overcome the force of said biasing means;
ratchet means on each of said reels;
pawl means including a first pawl rotatable about a first axis to engage said ratchet means of a first one of said reels and a second pawl rotatable about a second axis offset from said first axis to engage a second ratchet means, each of said pawls being displaceable between an unlocking position and a locking position in which each of said pawl means has locking engagement with its associated ratchet means to prevent its rotation in a web extending direction;
a common actuating means displaceable from a rest position to a pawl actuating position to simultaneously acutate each of said pawl means to said locking position; and
an inertia type sensing means to move said common actuating means to said actuating position when said sensing means detects a predetermined force for preventing rotation of each of said reels in a web extending direction;
said reels comprising an upper reel and a lower reel with said pawl means associated with said upper reel being beneath said upper reel and said pawl means associated with said lower reel being above said lower reel.

4. An apparatus in accordance with claim 3 in which said common actuating means comprises a turnable actuator having a portion for lifting one of said pawl means into locking engagement with said ratchet means on said upper reel and a portion for pushing the other of said pawl means downward into locking engagement with said ratchet means on said lower reel.

5. An apparatus in accordance with claim 4 in which said common actuating means comprises a rotatable lifter having portions projecting in opposite directions from an axis of rotation thereof for lifting said one of said pawl means into locking engagement and for pushing said other of said pawl means down into locking engagement.

6. An apparatus in accordance with claim 5 in which one of said portions projecting from said axis of rotation is flexible and flexes if its associated pawl means hits a tooth of said ratchet means, and then forces said pawl means into locking engagement as said reel turns slightly.

7. A seat belt retraction apparatus comprising:
a support means;
a pair of reels, the axis of which are coplaner mounted for rotation in said support means;
webbing attached at one end to each of said reels;
biasing means urging each of said reels in a retraction direction to wind said webbing therearound, said webbing extendable from said reels by a pull on said webbing to overcome the force of said biasing means;
ratchet means on each of said reels;
pawl means including a first pawl rotatable about a first axis to engage said ratchet means of a first one of said reels and a second pawl rotatable about a second axis offset from said first axis to engage a second ratchet means, each of said pawls being displaceable between an unlocking position and a locking position in which each of said pawl means has locking engagement with its associated ratchet means to prevent its rotation in a web extending direction;

a common actuating means displaceable from a rest position to a pawl actuating position to simultaneously actuate each of said pawl means to said locking position;

an inertia type sensing means to move said common actuating means to said actuating position when said sensing means detects a predetermined force for preventing rotation of each of said reels in a web extending direction, said inertia type sensing means being located generally outwardly of the ends of said ratchet means.

8. A seat belt retraction apparatus comprising:
a support frame;
a pair of reels mounted for rotation in said support frame;
a webbing portion attached to each of said reels;
ratchet means associated with each of said reels;
independent locking means associated with each of said reels displaceable between an unlocking position and a locking position in which said locking means has locking engagement with said associated ratchet means to prevent rotation of each of said reels in a web extending direction;
actuating means displaceable from a rest position to an actuating position to actuate each of said locking means to said locking position;
said actuating means moving either of said locking means into said locking position irrespective of engagement of the other of said locking means with said associated ratchet means; and,
an inertia type sensing means to move said actuating means to said actuating position when said sensing means detects a predetermined force to prevent rotation of such of said reels whose associated ratchet wheels lockingly engages with said associated locking means;
said actuating means being a common actuator for simultaneously activating each of said locking means;
said common actuator comprising a rotary lifter having projecting portions for pushing each of said locking means into locking engagement with said associated ratchet means;
at least one of said portions being flexible and flexes if either locking means fails to engage its associated ratchet means;
said lifter rotating to move the other of said locking means into locking engagement with its associated ratchet means.

9. A seat belt retraction apparatus comprising:
a support means;
a pair of reels, the axis of which are coplaner mounted for rotation in said support means;
webbing attached at one end to each of said reels;
biasing means urging each of said reels in a retraction direction to wind said webbing therearound, said webbing extendable from said reels when a pull on said webbing against said biasing means overcomes the force of said biasing means;
ratchet means on each of said reels;
pawl means including a first pawl rotatable about a first axis to engage said ratchet means of a first one of said reels and a second pawl rotatable about a second axis offset from said first axis to engage a second ratchet means, each of said pawls being movable from an unlocking position to a locking position in which said pawl has locking engagement with said ratchet means to prevent rotation of its reel in a web extending direction; and an inertia type sensing means located outwardly of the ends of said ratchet means which upon application of a predetermined force thereto causes displacement of said pawl means to said locking position to prevent rotation of each of said reels in a web extending direction.

10. A seat belt retraction apparatus comprising:
a support means;
an upper reel and a lower reel the axis of which are coplaner mounted for rotation in said support means;
webbing attached at one end of each of said reels;
ratchet means on each of said reels;
an upper pawl means associated with said upper reel and rotatable about a first axis, and a lower pawl means associated with said lower reel and rotatable about a second axis offset from said first axis, each of said pawl means displaceable between an unlocking and a locking position in which each of said pawls means has locking engagement with said associated ratchet means to prevent rotation of each of said reels in a web extending direction;
a common actuating means displaceable from a rest position to a pawl-actuating position to simultaneously actuate each of said pawl means to said locking position; and
an inertia type sensing means located outwardly of the ends of said ratchet means, to move said common actuating means to said actuating position when said sensing means detects a predetermined force for preventing rotation of each of said reels in a web extending direction.

11. An apparatus in accordance with claim 10 in which said common actuating means comprises a turnable actuator having a portion for lifting said upper pawl means into locking engagement with said ratchet means on said upper reel and for pushing said lower pawl means downward into engagement with said ratchet means on said lower reel.

12. An apparatus in accordance with claim 11 in which said common actuating means comprises a rotatable lifter having portions projecting in opposite directions from an axis of rotation therefor for pushing said lower pawl means down into locking engagement and for lifting said upper pawl means into locking engagement.

13. An apparatus in accordance with claim 12 in which one of said portions projecting from said axis of rotation is flexible and flexes if its associated pawl means hits a tooth of said ratchet means and then forces said pawl means into locking engagement as said reel means turns slightly.

14. A seat belt retraction apparatus comprising:
a channel shaped frame having a pair of opposite parallel side walls;
an upper and lower reel each journaled for rotation in said side walls;
a shoulder belt end of webbing attached at one end to the upper reel and a lap belt of webbing attached at one end to the lower reel;
biasing means urging each of said reels in a retraction direction to wind said webbing therearound, said webbing extendable from said reels by a pull on said webbing to overcome the force of said biasing means;

a pair of ratchet wheels on each of said reels;

first and second pawls journaled for swinging movement in said side frames about first and second offset axes and displaceable between an unlocking position and a locking position in which each of said pawl means has locking engagement with its associated pair of ratchet wheels to prevent rotation of each of said reels in a web extending direction;

a common turnable member carried on one of said side walls and turnable from a rest position to a pawl actuating position to simultaneously actuate each of said pawls to said locking position; and an inertia means to move said common turnable member to said actuating position when said sensing means detects a predetermined force for preventing rotation of each of said reels in a web extending direction.

15. A seat belt retraction apparatus comprising:
a retractor frame;
a pair of reels each mounted in said retractor frame for rotation;
webbing attached at one end to each of said reels;
biasing means urging each of said reels in a retraction direction to wind said webbing therearound, said webbing extendable from said reels by a pull on said webbing to overcome the force of said baising means;

ratchet means on each of said reels;

a pair of pawls of substantially identical shape mounted in swinging in opposite directions about respective pivot axis which are offset from each other, a weight secured to one of said pawls to change its center of gravity to a side opposite the pivot axis of the other of said pawls to swing it in a direction opposite to that of said other pawl;

each of said pawls associated with one of said reels and displaceable between an unlocking position and a locking position in which each of said pawls has locking engagement with its associated ratchet means to prevent rotation of each of said reels in a web extending direction;

a common actuating means displaceable from a rest position to a pawl actuating position to turn simultaneously each of said pawls in opposite directions to its locking position; and an inertia type sensing means to move said common actuating means to said actuating position when said sensing means detects a predetermined force for preventing rotation of each of said reels in a web extending direction.

* * * * *